March 14, 1961  J. G. RUSSELL  2,974,678
FUEL TANK AIR SUPPLY AND RELIEF VALVE
Filed June 17, 1955  2 Sheets-Sheet 1

INVENTOR.
JOHN G. RUSSELL
BY
Oberlin & Limbach
ATTORNEYS

March 14, 1961 J. G. RUSSELL 2,974,678
FUEL TANK AIR SUPPLY AND RELIEF VALVE
Filed June 17, 1955 2 Sheets-Sheet 2
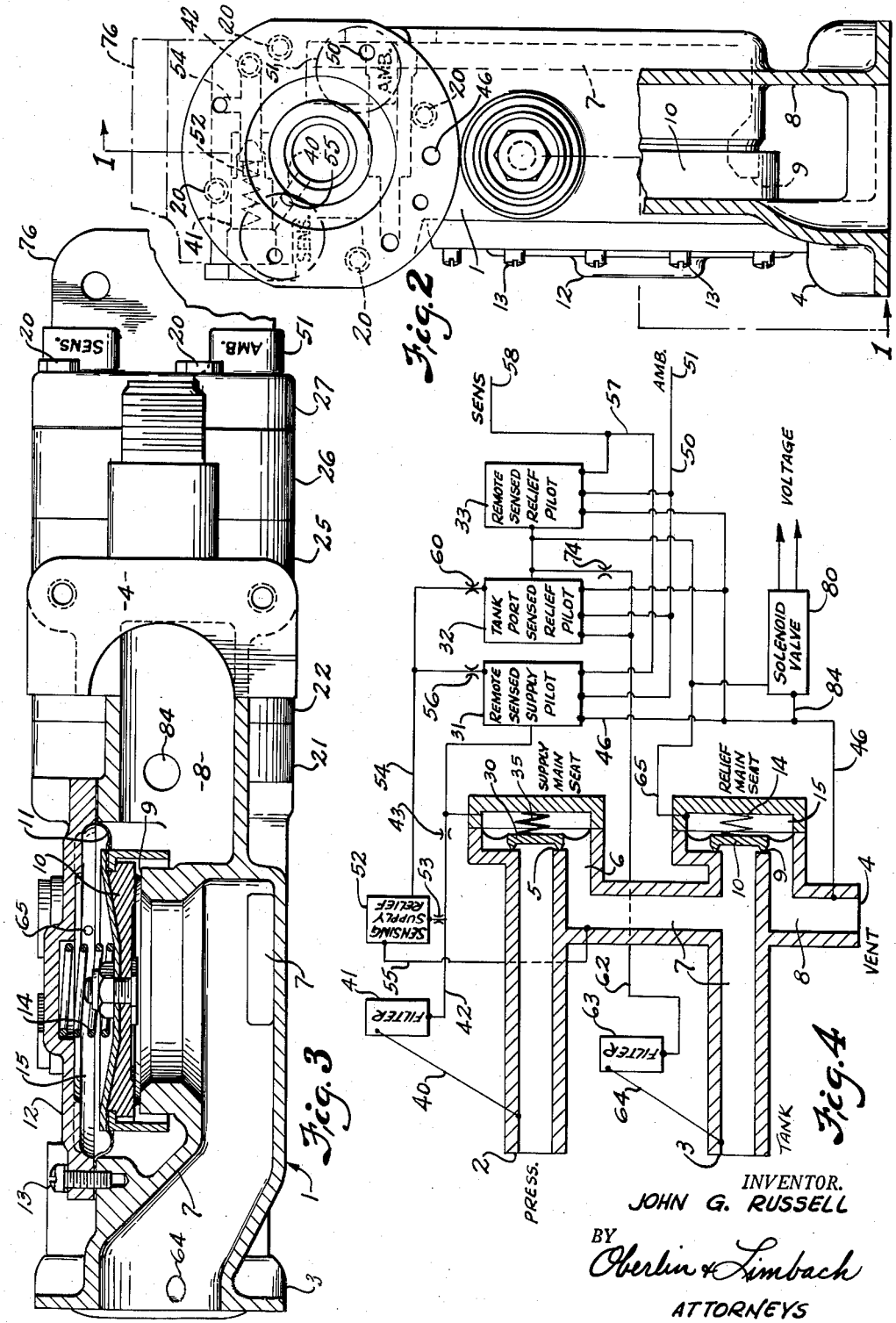
INVENTOR.
JOHN G. RUSSELL
BY
Oberlin & Limbach
ATTORNEYS

United States Patent Office 2,974,678
Patented Mar. 14, 1961

2,974,678

FUEL TANK AIR SUPPLY AND RELIEF VALVE

John G. Russell, Mayfield Heights, Ohio, assignor to Parker Hannifin Corporation, a corporation of Ohio Filed June 17, 1955, Ser. No. 516,160

11 Claims. (Cl. 137—489)

The present invention relates generally as indicated to a fuel tank air supply and relief valve, and more particularly to such valve for use in the control of air pressure in aircraft fuel tanks or the like. In its broader aspects, the invention herein is concerned simply with improvements in a fluid control valve which may have utility in any fluid (liquid or gas) system.

In aircraft fuel systems it has been found desirable and necessary for the proper functioning thereof to constantly maintain a predetermined air pressure on the fuel tanks so as to preclude or minimize vaporization of the fuel in the tanks and in the booster pump intake ports. In fact, under certain conditions, as when the booster pump is inoperative or when none is employed, it is desired to maintain sufficient air pressure in the fuel tanks so that a positive fuel pressure is maintained at the inlet of the engine-driven fuel pump.

In aircraft pneumatic systems, the air pressure is generally of much greater magnitude than can be utilized in the pressurizing of fuel tanks; and, therefore, suitable controls must be provided to maintain the air pressure in the fuel tanks within prescribed limits less than the pressure in the pneumatic system. Provision must also be made for rapidly relieving the fuel tank air pressure in the event of malfunctioning of any of the control units.

It is, therefore, a primary object of this invention to provide an air supply and relief valve assembly for aircraft fuel systems and the like which is fool-proof in operation and by means of which accurate control of the air pressure in the fuel tank is effected.

It is another object of this invention to provide a valve assembly of the character indicated which embodies, in a unitary casing structure, a main air supply valve, a main relief valve, and a successively arranged series of pressure-actuated pilot valves for controlling the operation of said main air supply and main relief valves.

It is another object of this invention to provide a valve assembly of the character indicated in which the main relief valve aforesaid has associated therewith means for opening said relief valve to vent the fuel tank air pressure independently of the pilot valve control aforesaid.

It is another object of this invention to provide a valve assembly of the character indicated in which a main air supply valve and pilot valves for operating the same and for operating a main relief valve are mounted in juxtaposed relation to form a lightweight and compact assembly of which the juxtaposed parts constitute the casing or body elements of successive valves.

Other objects and advantages of the present invention will be come apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of a few of the various ways in which the principle of the invention may be employed.

In said annexed drawings:

Fig. 2 is an end elevation view (with an end cap and mounting bracket removed), said view being partly in section as represented by the line 2—2, Fig. 1;

Fig. 3 is a cross-section view taken substantially along the line 3—3, Fig. 1; and Fig. 4 is a schematic diagram of the valve assembly herein.

Figure 1:
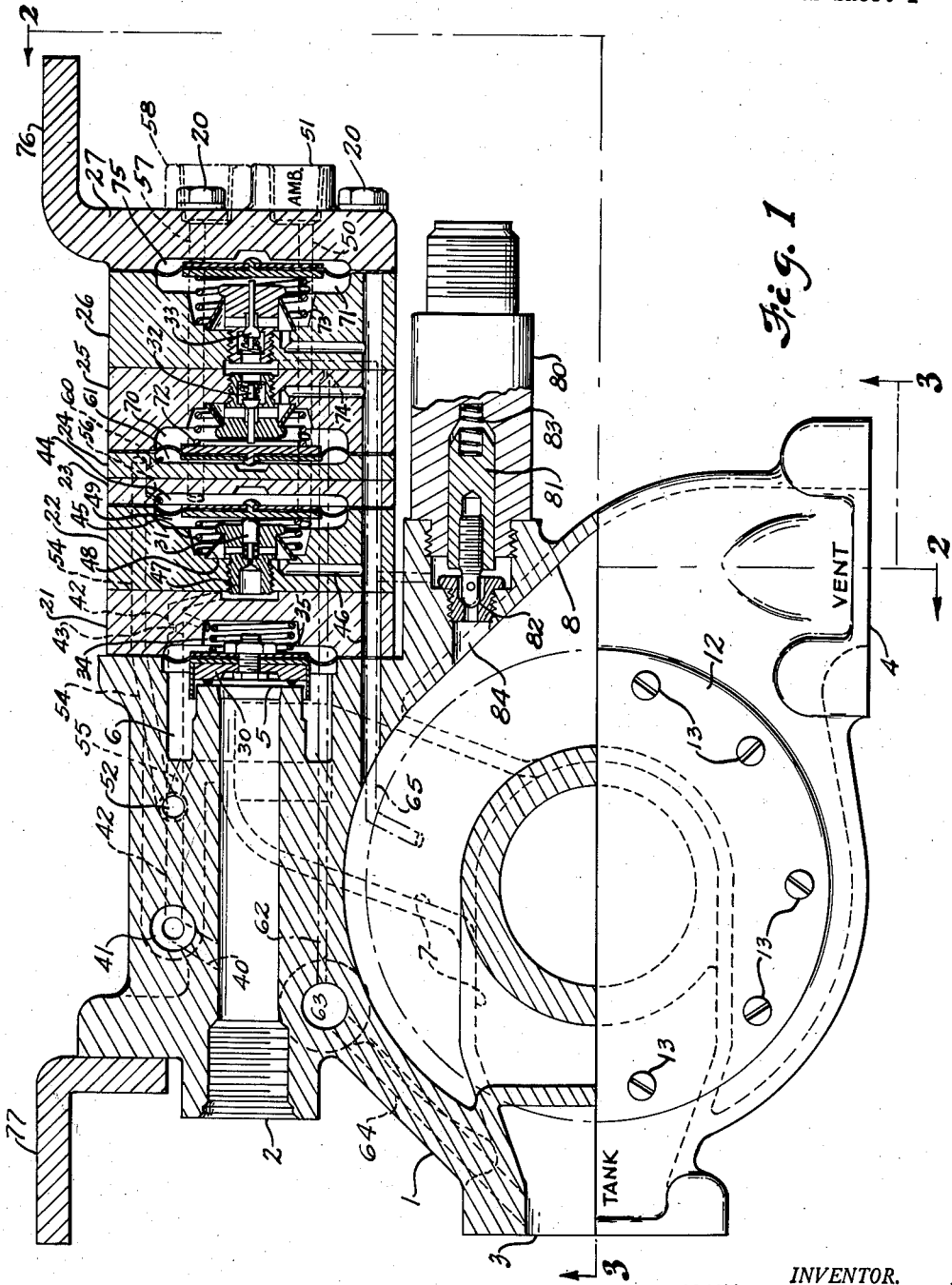
Fig. 1 is a cross-section view of one embodiment of the invention, such cross-section having been taken substantially along the line 1—1, Fig. 2.

The valve assembly constituting the present invention comprises a main casing part 1 formed with three ports, viz. a pressure port 2 which is adapted for connection to an air supply line at a desired pressure, such as 25 to 200 p.s.i., for example; a tank port 3 which is adapted to be connected to a fuel tank in which it is to maintain an air pressure of 6½ to 7¼ p.s.i., for example; and a vent port 4 through which excess air pressure in the tank port 3 and in the line leading to the tank is adapted to be exhausted.

The pressure port 2 terminates in an annular valve seat 5 and the tank port 3 communicates with the annular chamber 6 surrounding seat 5 by way of the passage 7 formed in the main casing part 1.

Intersecting the aforesaid passage 7 is a passage 8 terminating in an annular seat 9 with which a main relief valve 10 cooperates to open and close fluid communication between the tank and vent ports 3 and 4.

The main relief valve 10 is herein shown as being of the diaphragm type wherein the peripheral portion of a diaphragm 11 is clamped between the main casing 1 and a cap or cover plate 12 which may be secured to the casing as by means of a series of screws 13. The central portion of the diaphragm 11 carries the relief valve member designated by numeral 10 and consisting of plates clamping the diaphragm therebetween and a rubber-like annular ring secured to one plate to cooperate with the aforesaid seat 9. A spring 14 compressed between said relief valve member 10 and said cap 12 yieldably holds the former in its seat-engaging position to prevent flow of air from the tank port 3 to the vent port 4 by way of passages 7 and 8.

As will be seen later, when the air pressure in the relief valve chamber 15 is released to the atmosphere or reduced substantially below the pressure of the air acting on the opposite side of relief valve member 10 to an extent such that the seating effect of the chamber air pressure and spring pressure is less than the unseating effect of the tank port pressure, said valve member 10 will be moved away from seat 9 to permit the air pressure in the tank port 3 to be relieved through the vent port 4.

The main casing part 1 has secured thereto as by means of the screws 20 a series of juxtaposed plates 21 to 27 which constitute casings for a main air control valve 30, a pilot valve 31 for said main valve, and two pilot valves 32 and 33 for controlling the main relief valve 10.

The main air control valve 30 and said pilot valves 31–33 are each preferably of the diaphragm type and are now to be described in detail.

The main control valve 30 has its flexible diaphragm clamped between the main casing part 1 and the first one 21 of said superimposed plates 21 to 27. The central portion of said diaphragm carries the movable valve member (designated by numeral 30) having an annular seat preferably of rubber or rubber-like material, engageable and disengageable from the seat 5 aforesaid.

When said valve member 30 is disengaged from the seat 5, air under pressure from a supply source flows into the pressure port 2 and through the annular chamber 6 and the tank port passage 7. The plate 21 forms with the aforesaid diaphragm a chamber 34 in which air under pressure and a compression spring 35 is effective to normally urge the valve member 30 toward seated position in opposition to the unseating force of the air pressure in pressure port 2.

Intersecting the pressure port passage is a passage 40 which leads into one end of a filter 41 and the filtered air is led into the aforesaid chamber 34 through the passage 42 in the casing part 1 and in the plate 21. Accordingly, when the air pressures are substantially equal in the pressure port passage 2 and in the chamber 34, the main valve member 30 will be held in seated position under the influence of the spring 35 and also under the influence of the air pressure acting on the larger effective area of the main valve member diaphragm on the chamber side as compared with the effective area of said diaphragm on the pressure passage side. Of course, the air pressure in the tank port 3 and passage 7 tends to move the main valve to unseated position, but such pressure is of much less magnitude, that is, 6½ to 7¼ p.s.i. as compared with the 25 to 200 p.s.i. air pressure in the pressure passage 2 and chamber 34.

Accordingly, it is evident that, if the air in the chamber 34 is vented more rapidly than it can be replenished through the orifice 43 in passage 42, the air pressure in the pressure passage 2 will predominate to an extent to force the valve member 30 away from its seat 5.

Such releasing of the air pressure in the chamber 34 is accomplished through the pilot valve 31, the housing of which is defined by the plates 22 and 23 which clamp therebetween the peripheral portion of a pilot valve engaging diaphragm.

When the pressure in the chamber 44 (behind the diaphragm of pilot valve 31) drops below a prescribed value, the spring 45 actuates said diaphragm in a direction permitting the pilot valve member 31 to move away from its seat under the influence of the spring acting thereon and of the air pressure acting on the small left-hand end thereof; and when this occurs, the air in the main valve chamber 34 is vented through the passage 42, through the open pilot valve 31, and through the passage 46, the last-named passage leading into the vent passage 8 of the main casing 1.

Such venting will occur more rapidly than air can be replenished into chamber 34 from the pressure passage 2, whereby the main valve member 30 will be forced away from its seat. When said pilot valve member 31 moves to seated position, the air pressure in the chamber 34 will again build up to a value substantially equal to the line pressure in passage 2 whereby the main valve member 30 will be forced to seated position.

The body 47 of the pilot valve member 31 is screwed into the plate 22 and a frusto-conical washer 48 is provided so that, when the pilot valve member is opened, the puffs of air do not affect the atmospheric pressure in the ambient chamber 49, which chamber is vented to the atmosphere through the passage 50 formed in the plates 22 to 27 and leading to the ambient port 51.

The main casing part 1 has mounted therein a sensing supply relief valve 52, the inlet side of which communicates by way of an orifice 53 (see Fig. 4) with the filter outlet passage 42. The inlet side of said relief valve also communicates with a passage 54 formed in the casing 1 and in the plates 21, 22, 23, and 24. The relief port of said sensing supply relief valve 52 leads to the chamber 6 or to the tank port passage 7 by way of passage 55. The sensing supply relief valve 52 may be of conventional form as best shown in Fig. 2 in which the valve member thereof is held closed by spring pressure until the pressure in the passages 54 and 42 on the inlet side thereof is high enough to overcome the spring pressure to thereby vent the excess pressure through the passage 55 into chamber 6, or into passage 7, as just described above.

The flow of sensing supply air into the chamber 44 of the pilot valve 31 is controlled by an orifice 56, and normally there will be a continuous flow of air through the chamber 44 and through a passage 57 formed in the plates 23 to 27 leading to the sensing port 58 and, in turn, said sensing port 58 will be connected to a convenient point of a fuel tank so as to sense the air pressure in the tank. With further reference to the sensing supply relief valve 52, as best shown in Fig. 4, although the air pressure in the passage 42 from the filter 41 may be at a relatively high pressure of from say 25 to 200 p.s.i. the same as in pressure port 2, it is to be noted that the air in passage 42 is communicated with the inlet side of said sensing supply relief valve 52 through the orifice 53. Likewise, the passage 54 which also has communication with the inlet side of said sensing supply relief valve 52 has an orifice 56 upstream of the chamber 44 of the pilot valve 31, this chamber, in turn, being open by way of passage 57 to the sensing port 58. Accordingly, as the fuel in the fuel tank is being used up in flight of the airplane, there will be a continuous flow of air into the tank from passage 42 through orifice 53, through passage 54, through orifice 56, through pilot valve chamber 44, through passage 57 and sensing port 58 to the tank. If this flow of air to the tank via the sensing port 58 is insufficient to maintain the desired pressure on the fuel the spring 45 will urge the diaphragm of the pilot valve 31 toward the right, as viewed in Fig. 1, whereby the pilot valve 31 will open to permit opening of the main air supply valve 30. If, on the other hand, such supply of sensing air through sensing port 58 is excessive the air flow through the orifices 53 and 56 (see Fig. 4) will decrease to the extent that air pressure in passage 54 will rise sufficiently to unseat the valve member in the sensing supply relief valve 52 for relief of excess air through the passage 55 into the passage 7, as best shown in Fig. 4. Such opening of the sensing supply relief valve 52 will, therefore, decrease the air pressure in the passage 54 with consequent decreased air flow through the orifice 56 to the sensing port 58.

In this particular case, when the tank air pressure drops to a value less than 6½ p.s.i., the corresponding reduction of pressure in the chamber 44 of the pilot valve 31 will permit the spring 45 to urge the associated diaphragm toward the right as viewed in Fig. 1, with the result that the pilot valve member 31 will move to unseated position under the influence of the spring acting thereon and of the air pressure acting thereon as aforesaid to permit unseating of the main valve member 30 as already explained. Thus, air will be supplied into the fuel tank by way of the pressure port 2 and the tank port 3.

When the tank air pressure builds up to about 6½ p.s.i., the corresponding buildup of pressure in the pilot valve chamber 44 will force the diaphragm toward the left, as viewed in Fig. 1, with consequent actuation of the pilot valve member 31 to its seated position. Then, as already explained, the main valve member 31 will be moved to seated position, to discontinue the supply of air into the tank.

Adjacent to the aforesaid pilot valve 31 which controls the main valve 30 are two successive diaphragm-type pilot valves 32 and 33 which operate on the same general principle as pilot valve 31, but instead effect opening and closing of the main relief valve 10.

As shown, the sensing supply passage 54 leads, via orifice 60, into the chamber 61 defined between the diaphragm of pilot valve 32 and the plate 24. In addition, there is a passage 62 through the plates 21 to 25 and in the casing part 1 leading to the outlet end of another filter 63, and in turn the inlet end of said filter communicates with a passage 64 opening into tank port passage 7. Orifice 74 connects passages 62 and 65.

The plates 21 to 26 are formed with a passage 65 which enters the casing part 1 in the chamber 15 above the main relief valve member 10, and such passage extends radially to the common inlet end of the opposed pilot valve members 32 and 33.

As before, the pilot valves 32 and 33 include ambient chambers 70 and 71 respectively communicating with the ambient passage 50 and have springs 72 and 73 therein normally tending to move the diaphragms of the respective pilot valves 32 and 33 in a direction permitting the pilot valve members 32 and 33 to move to seated position.

The pilot valve 32 is so designed that, should the air pressure in the tank port 3 build up to, say, 7 p.s.i. and in the chamber 61, the associated diaphragm will be urged toward the right as viewed in Fig. 1 to cause the pilot valve member 32 to move to unseated position. Thus, the chamber 15 behind the relief valve diaphragm 11 is vented faster than the air can be replenished through the orifice 74 in the tank port sensing passage 62. As a result, the chamber 15 pressure will drop to a value considerably less than 7 p.s.i., whereupon 7 p.s.i. air pressure in the tank port passage 7 will force the relief valve member 10 away from its seat 9 to relieve the excess pressure out through the vent port 4.

The remaining pilot valve 33 is of substantially the same structure as the pilot valve 32 just described, except that pilot valve 33 is set to effect opening of the relief valve 10 in the event that the air pressure in the fuel tank and in the line connected to the sensing port 58 and passage 57 and in the chamber 75 builds up to 7¼ p.s.i. Should the air pressure in chamber 75 and in the tank build up to this value, the relief valve 10 will again be opened by reason of the releasing of the pressure in the chamber 15 by way of passage 65, open pilot valve 33, and vent passage 46.

It is to be noted that the end plate 27 has a lateral extension 76 which, together with the member 77 secured to the casing 1 at the pressure port 2 end thereof, form brackets by which the valve assembly may be conveniently mounted.

In the event that it is desired to reduce the pressure in the tank to some low value of say ½ p.s.i. to zero, there is provided a solenoid-operated valve 80 in which the armature 81 is in the form of a movable valve member cooperating with a seat 82 and normally held in seated position by means of the compression spring 83. When the solenoid of said valve 81 thereof is energized, the armature 81 will be drawn toward the right as viewed in Fig. 1, whereby the relief valve chamber 15 will be vented by way of passage 65, open valve 80, and passage 84 into the vent passage 8 so as to reduce the pressure in the relief valve chamber 15 to substantially atmospheric pressure, whereby the tank and tank port 3 pressure may easily effect opening of the relief valve 10.

Other modes of applying the principle of the invention may be employed, change being made as regards the details described, provided the features stated in any of the following claims, or the equivalent of such, be employed.

I therefore particularly point out and distinctly claim as my invention:

1. A valve assembly comprising a valve casing formed with inlet, outlet, and vent ports, a main valve member movably supported in said casing to open and close fluid communication between said inlet and outlet ports, a relief valve member movably supported in said casing to open and close fluid communication between said outlet and vent ports, and pilot valve members in said casing respectively operative to permit opening of said main valve member when the fluid pressure in said outlet port is less than a predetermined value and to permit opening of said relief valve member when the fluid pressure in said outlet port is greater than a predetermined value, said casing defining with the side of said main valve member that is opposite to the side exposed to fluid under pressure in said inlet port a chamber that has fluid communication with said inlet port, and said casing defining with the side of said relief valve member that is opposite to the side exposed to fluid under pressure in said outlet port another chamber that has fluid communication with said outlet port, said pilot valve members being effective to vent such chambers whereby fluid under pressure in said inlet port opens said main valve member and fluid under pressure in said outlet port opens said relief valve member.

2. A valve assembly comprising a valve casing formed with inlet, outlet, and vent ports, a main valve member movably supported in said casing to open and close fluid communication between said inlet and outlet ports, a relief valve member movably supported in said casing to open and close fluid communication between said outlet and vent ports, pilot valve members in said casing respectively operative to permit opening of said main valve member when the fluid pressure in said outlet port is less than a predetermined value and to permit opening said outlet port is greater than a predetermined value, of said relief valve member when the fluid pressure in said outlet port is greater than a predetermined value, said casing defining with the side of said main valve member that is opposite to the side exposed to fluid under pressure in said inlet port a chamber that has fluid communication with said inlet port, and said casing defining with the side of said relief valve member that is opposite to the side exposed to fluid under pressure in said outlet port another chamber that has fluid communication with said outlet port, said pilot valve members being effective to vent such chambers whereby fluid under pressure in said inlet port opens said main valve member and fluid under pressure in said outlet port opens said relief valve member, and a solenoid valve operative when energized to open said relief valve member.

3. A valve assembly comprising a valve casing formed with inlet, outlet, and vent ports, a main valve member movably supported in said casing to open and close fluid communication between said inlet and outlet ports, a relief valve member movably supported in said casing to open and close fluid communication between said outlet and vent ports, and pilot valve members in said casing respectively operative to permit opening of said main valve member when the fluid pressure in said outlet port is less than a predetermined value and to permit opening of said relief valve member when the fluid pressure in said outlet port is greater than a predetermined value, said casing defining with the side of said main valve member that is opposite to the side exposed to fluid under pressure in said inlet port a chamber that has fluid communication with said inlet port, and said casing defining with the side of said relief valve member that is opposite to the side exposed to fluid under pressure in said outlet port another chamber that has fluid communication with said outlet port, said pilot valve members being effective to vent such chambers whereby fluid under pressure in said inlet port opens said main valve member and fluid under pressure in said outlet port opens said relief valve member, said valve casing comprising a series of juxtaposed main valve and pilot valve housing members.

4. A valve assembly comprising a valve casing formed with inlet, outlet, vent, and sensing ports respectively adapted to be connected to a fluid pressure source, to a unit to which fluid under pressure is to be supplied, to the atmosphere, and to such unit; a main valve member movably supported in said casing to open and close communication between said inlet and outlet ports; a relief valve member movably supported in said casing to open and close communication between said outlet and vent ports; and pilot valve members in said casing respectively operative to permit opening of said main valve member when the fluid pressure at said sensing port drops below a predetermined value, to permit opening of said relief valve member when the fluid pressure at said sensing port increases above a predetermined value, and to permit opening of said relief valve member when the fluid pressure at said outlet port increases above a predetermined value.

5. A valve assembly comprising a valve casing formed with inlet, outlet, vent, and sensing ports respectively adapted to be connected to a fluid pressure source, to a unit to which fluid under pressure is to be supplied, to the atmosphere, and to such unit; a main valve member movably supported in said casing to open and close communication between said inlet and outlet ports, a relief valve member movably supported in said casing to open and close communication between said outlet and vent ports; pilot valve members in said casing respectively operative to permit opening of said main valve member when the fluid pressure at said sensing port drops below a predetermined value, to permit opening of said relief valve member when the fluid pressure at said sensing port increases above a predetermined value, and to permit opening of said relief valve member when the fluid pressure at said outlet port increases above a predetermined value; and a solenoid valve operative, when energized, to permit opening of said relief valve member.

6. A valve assembly comprising a valve casing formed with inlet, outlet, vent, and sensing ports respectively adapted to be connected to a fluid pressure source, to a unit to which fluid under pressure is to be supplied, to the atmosphere, and to such unit; a main valve member movably supported in said casing to open and close communication between said inlet and outlet ports; a relief valve member movably supported in said casing to open and close communication between said outlet and vent ports; and pilot valve members in said casing respectively operative to permit opening of said main valve member when the fluid pressure at said sensing port drops below a predetermined value, to permit opening of said relief valve member when the fluid pressure at said sensing port increases above a predetermined value, and to permit opening of said relief valve member when the fluid pressure at said outlet port increases above a predetermined value; said valve casing comprising a series of juxtaposed main valve and pilot valve housing members.

7. A valve assembly comprising a valve casing formed with inlet, outlet, vent, and sensing ports respectively adapted to be connected to a fluid pressure source, to a unit to which fluid under pressure is to be supplied, to the atmosphere, and to such unit; a main valve member movably supported in said casing to open and close communication between said inlet and outlet ports; a relief valve member movably supported in said casing to open and close communication between said outlet and vent ports; and pilot valve members in said casing respectively operative to permit opening of said main valve member when the fluid pressure at said sensing port drops below a predetermined value, to permit opening of said relief valve member when the fluid pressure at said sensing port increases above a predetermined value, and to permit opening of said relief valve member when the fluid pressure at said outlet port increases above a predetermined value; said valve casing comprising a main part formed with said inlet, outlet, and vent ports, and a series of juxtaposed main valve and pilot valve housing members providing said sensing port and a passage leading to the associated pilot valve members.

8. A valve assembly comprising a valve casing formed with inlet, outlet, vent, and sensing ports respectively adapted to be connected to a fluid pressure source, to a unit to which fluid under pressure is to be supplied, to the atmosphere, and to such unit; a main valve member movably supported in said casing to open and close communication between said inlet and outlet ports; a relief valve member movably supported in said casing to open and close communication between said outlet and vent ports; and pilot valve members in said casing respectively operative to permit opening of said main valve member when the fluid pressure at said sensing port drops below a predetermined value, to permit opening of said relief valve member when the fluid pressure at said sensing port increases above a predetermined value, and to permit opening of said relief valve member when the fluid pressure at said outlet port increases above a predetermined value; said main valve member having a chamber therebehind which is in fluid communication with said inlet port and which is adapted to be vented by the associated pilot valve member for movement of said main valve member to open position under the then predominating fluid pressure in said inlet port.

9. A valve assembly comprising a valve casing formed with inlet, outlet, vent, and sensing ports respectively adapted to be connected to a fluid pressure source, to a unit to which fluid under pressure is to be supplied, to the atmosphere, and to such unit; a main valve member movably supported in said casing to open and close communication between said inlet and outlet ports; a relief valve member movably supported in said casing to open and close communication between said outlet and vent ports; and pilot valve members in said casing respectively operative to permit opening of said main valve member when the fluid pressure at said sensing port drops below a predetermined value, to permit opening of said relief valve member when the fluid pressure at said sensing port increases above a predetermined value, and to permit opening of said relief valve member when the fluid pressure at said outlet port increases above a predetermined value; said relief valve member having a chamber therebehind which is in fluid communication with the associated pilot valve members and which is adapted to be vented by any of the associated pilot valve members for movement of said relief valve member to open position under the then predominating fluid pressure in said outlet port.

10. A valve assembly comprising a valve casing formed with inlet, outlet, vent, and sensing ports respectively adapted to be connected to a fluid pressure source, to a unit to which fluid under pressure is to be supplied, to the atmosphere, and to such unit; a main valve member movably supported in said casing to open and close communication between said inlet and outlet ports; a relief valve member movably supported in said casing to open and close communication between said outlet and vent ports; and pivot valve members in said casing respectively operative to permit opening of said main valve member when the fluid pressure at said sensing port drops below a predetermined value, to permit opening of said relief valve member when the fluid pressure at said sensing port increases above a predetermined value, and to permit opening of said relief valve member when the fluid pressure at said outlet port increases above a predetermined value; said main valve member having a chamber therebehind which is in fluid communication with said inlet port and which is adapted to be vented by the associated pilot valve member for movement of said main valve member to open position under the then predominating fluid pressure in said inlet port; said relief valve member having a chamber therebehind which is in fluid communication with the associated pilot valve members and which is adapted to be vented by any of the associated pilot valve members for movement of said relief valve member to open position under the then predominating fluid pressure in said outlet port.

11. A valve assembly comprising a valve casing formed with inlet, outlet, vent, and sensing ports respectively adapted to be connected to a fluid pressure source, to a unit to which fluid under pressure is to be supplied, to the atmosphere, and to such unit; a main valve member movably supported in said casing to open and close communication between said inlet and outlet ports; a relief valve member movably supported in said casing to open and close communication between said outlet and vent ports; and pilot valve members in said casing respectively operative to permit opening of said main valve member when the fluid pressure at said sensing port drops below a predetermined value, to permit opening of said relief valve member when the fluid pressure at said sensing port increases above a predetermined value, and to permit opening of said relief valve member when the fluid pressure at said outlet port increases above a predetermined value; said main valve member having a chamber therebehind which is in fluid communication with said inlet port and which is adapted to be vented by the associated pilot valve member for movement of said main valve member to open position under the then predominating fluid pressure in said inlet port; said valve casing being formed with pilot valve chambers behind the respective pilot valve members, and with a passage leading from said inlet port to the chambers of the pilot valve members which open said main valve member and said relief valve member responsive to sensing port and outlet port pressures.

References Cited in the file of this patent

UNITED STATES PATENTS

| | | |
|---|---|---|
| 1,560,567 | Grant | Nov. 10, 1925 |
| 1,844,842 | Colosimo | Feb. 9, 1932 |
| 2,184,773 | Browning | Dec. 26, 1939 |
| 2,398,775 | Beekley | Apr. 23, 1946 |
| 2,490,113 | Campbell | Dec. 6, 1949 |